United States Patent [19]
Zeuner et al.

[11] 3,905,575
[45] Sept. 16, 1975

[54] THREE STAGE SOLENOID OPERATED VALVE ASSEMBLY

[75] Inventors: Kenneth W. Zeuner, Newtown; Alonzo B. Jarman, Wrightstown, both of Pa.

[73] Assignee: Control Concepts, Inc., Newtown, Pa.

[22] Filed: Mar. 20, 1974

[21] Appl. No.: 453,060

[52] U.S. Cl. ..................... 251/30; 251/29; 251/44; 251/47
[51] Int. Cl.² ...................................... F16K 31/383
[58] Field of Search ........................... 251/30, 29, 44

[56] References Cited
UNITED STATES PATENTS

| | | | |
|---|---|---|---|
| 2,575,272 | 11/1951 | Harris | 251/30 |
| 2,758,811 | 8/1956 | Peterson | 251/29 |
| 3,656,706 | 4/1972 | Johnston | 251/38 |
| 3,799,497 | 3/1974 | Zeunen | 251/30 |

*Primary Examiner*—Arnold Rosenthal
*Attorney, Agent, or Firm*—Allan Ratner

[57] ABSTRACT

A three stage solenoid operated poppet valve assembly for providing a substantially high speed opening for a high volume flow. The first of the three stages is a normally closed solenoid operated poppet valve which controls fluid flow through a second stage. A second stage poppet is movable with respect to a second stage orifice. A flow passage extension is in fluid communication with the second stage orifice for providing fluid flow from the second stage orifice into an outlet of the valve assembly. A third stage poppet is movable with respect to a third stage orifice which opens into the outlet. The third stage poppet has a longitudinal opening for receiving therein the flow passage extension.

13 Claims, 4 Drawing Figures

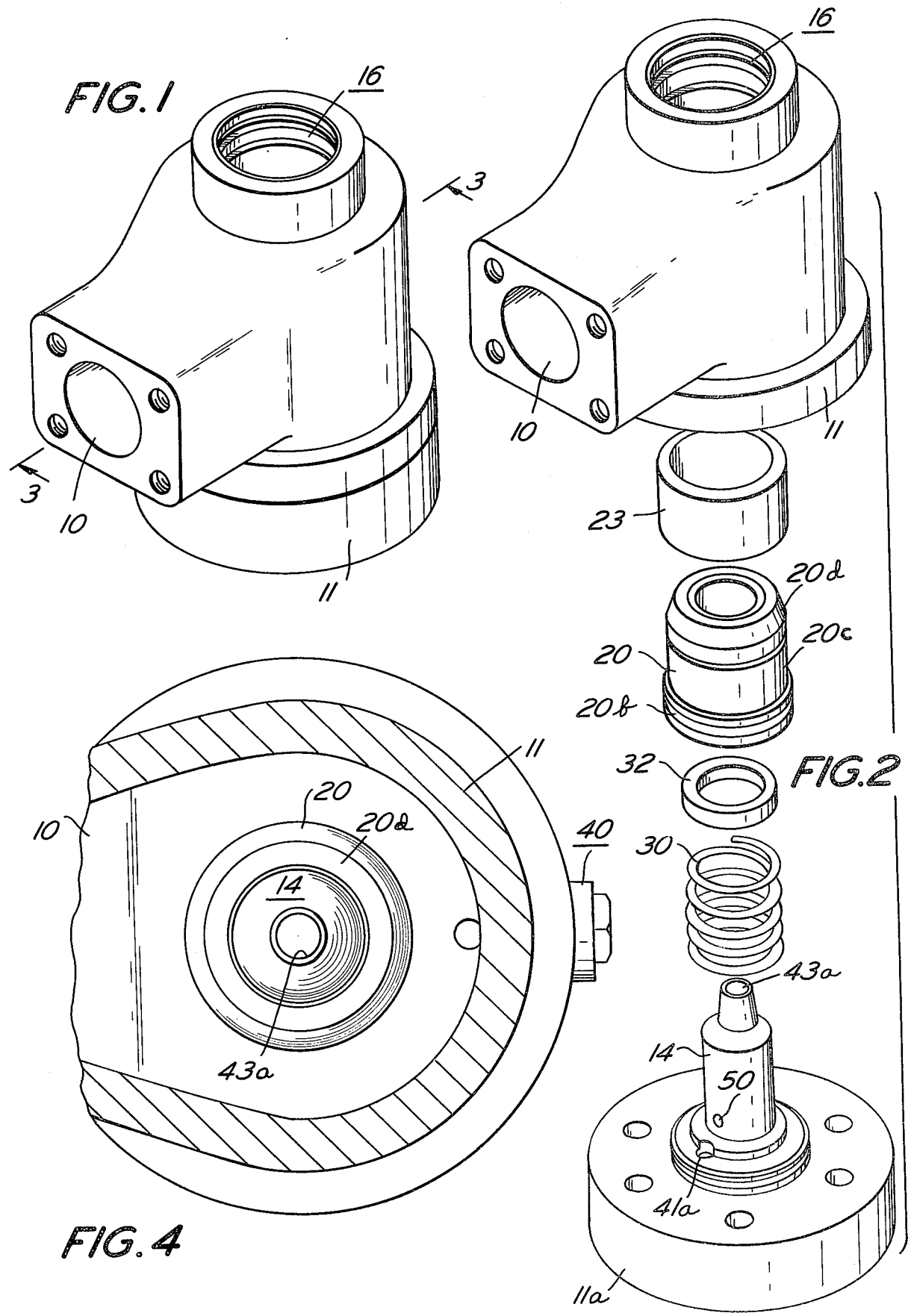

THREE STAGE SOLENOID OPERATED VALVE ASSEMBLY

BACKGROUND OF THE INVENTION

1. Field of the Invention

This invention relates to the field of three stage valve assemblies.

2. Prior Art

An important application for valve assemblies is in providing a substantially high speed opening for a high volume of fluid flow. Such an application arises for example in nuclear power plants where the valve assemblies are required to remain normally closed over a long interval of time. During that lengthy valve closed state, the valves must exhibit high efficiency or substantially no leakage. When actuated the valves are required to open extremely rapidly and handle a large magnitude of power to provide a safety release.

Prior valve assemblies such, for example, three stage servovalves, have left much to be desired in attempting to meet these requirements. Specifically, such prior assemblies have been designed to be massive in size to handle the high volume of fluid flow. However, because of their massiveness they were not able to achieve the required high value of valve opening speeds and had additional problems of leakage.

SUMMARY OF THE INVENTION

A three stage normally closed valve assembly which provides a substantially high speed opening for a substantially high volume of fluid flow from an inlet into an outlet. A first of the three stages comprises a solenoid operated valve assembly maintained normally closed which controls the fluid flow through a second stage. A second stage poppet is movable between a normally closed state seating in and closing a second stage orifice and a valve open state. A flow passage extension is in fluid communication with the second stage orifice for providing fluid flow from the second stage orifice into the outlet of the valve assembly. A third stage poppet is movable between a normally closed state seating in and closing a third stage orifice and a valve open state. The third stage orifice opens into the outlet. The third stage poppet has a longitudinal opening for receiving therein the flow passage extension.

BRIEF DESCRIPTION OF THE DRAWINGS

FIG. 1 is a perspective view of a normally closed three stage solenoid operated valve assembly of the present invention;

FIG. 2 is an exploded view of the valve assembly in FIG. 1;

FIG. 4 is a sectional view of the valve assembly of FIG. 1 taken along lines 4—4 of FIG. 3.

DESCRIPTION OF THE PREFERRED EMBODIMENTS

Figure 3:
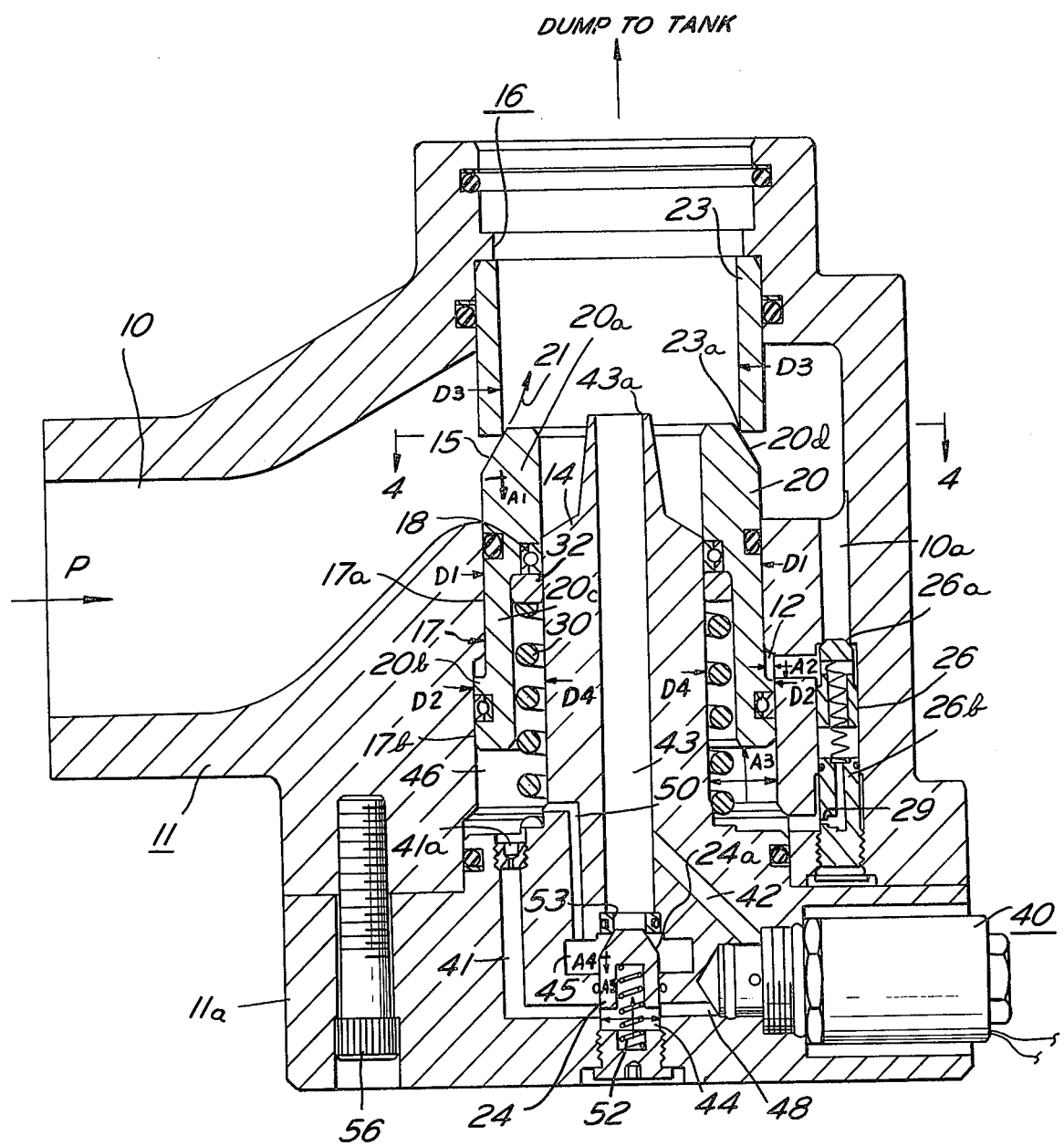
FIG. 3 is a sectional view of the valve assembly of FIG. 1 taken along lines 3—3 in the valve normally closed state.

Referring now to FIGS. 1–4, there is shown a normally closed solenoid operated three stage valve assembly formed within a body 11. The valve assembly comprises a third stage poppet 20, a third stage valve seat 23, a second stage poppet 24 and a first stage 40. Upstream fluid under pressure enters body 11 by way of an inlet port 10, flows around poppet 20 and third seat 20 and through fluid channel 10a. When poppet 20 is open, the fluid exits through seat 23 by way of outlet 16 where the fluid pressure is dumped to tank.

Body 11 has an internal cylindrical chamber 17 for slidably receiving and housing therein a third stage tubular poppet 20 having a central longitudinal opening extending throughout its length. Poppet 20 receives within its central opening a tubular extension member 14 vertically extending from end cap 11a of body 11. In this manner poppet 20 slides axially within and contacts chamber 17 and extension 14. Poppets 20 and 24 and extension 14 are all coaxial.

Poppet 20 has a reduced inner diameter section 20a adjacent its upper end which forms a shoulder to receive a sealing ring 18 and a seal retainer 32 to provide a fluid seal between the outer surface of extension 14 and section 20a. Chamber 17 has a reduced inner diameter section 17a with respect to inner diameter section 17b. Correspondingly, poppet 20 has a decreased outer diameter section 20c with respect to outer diameter section 20b. Accordingly, sections 17a and 20c are in slidable engagement as are sections 17b and 20b. It will now be seen that there is formed within chamber section 17b with respect to outer poppet section 20c a varying volume reset chamber 12 having an area in a transverse dimension of value $A_2$. $A_2$ is a function of the difference between the outer diameter of section 20b ($D_2$) and the outer diameter of section 20c ($D_1$).

Fluid flow from inlet port 10 may be traced through channel 10a, a poppet 26a of check valve 26 and into chamber 12. Fluid pressure in chamber 12 tends to push poppet 20 downwardly. Similarly, inlet fluid pressure in inlet port 10 with poppet 20 closed, is applied to an area 15 of poppet plug 20d having a value $A_1$. $A_1$ is a function of the difference between the diameter $D_1$ and the inner diameter of third stage seat 23 ($D_3$). The fluid pressure on areas $A_1$ and $A_2$ are in a direction tending to push poppet 20 to open the valve and allow fluid flow in the direction of arrow 21 from inlet pressure to dump to tank.

Fluid under pressure in channel 10a also flows through a restricted orifice 29 of check valve plug 26b to a varying volume poppet chamber 46. Chamber 46 surrounds tubular extension 14 behind poppet 20. Chamber 46 has an area in a transverse dimension of value $A_3$ which is a function of the difference between diameter $D_2$ and the outer diameter of member 14 ($D_4$). Area $A_3$ is preferably larger than the sum of areas $A_2$ and $A_1$. It will be understood that the fluid pressure under static conditions at areas $A_1$, $A_2$ and $A_3$ are each substantially the same value. Accordingly, in the static condition, with poppet 20 closed, it is maintained closed by the fluid pressure below poppet 20 in chamber 46.

A light spring 30 is disposed between and engages a lower wall of chamber 17 and seal retainer 32. Spring 30 provides a spring force or bias in a direction to close poppet 20. Under true balance conditions, poppet 20 could effectively move up or down but because of spring 30, poppet 20 is closed. As previously described with poppet 20 closed, it is maintained closed by fluid pressure in chamber 46.

Additionally, in the illustrated normally closed state, fluid pressure may also be traced from chamber 46 through a restricted orifice 41a, conduit 41, an area 44 behind second stage poppet 24 (as shown) and then to an inlet port 48 of first stage valve assembly 40. In addition, fluid pressure from area 46 may also be traced by way of conduit 50 to chamber 45 which surrounds a valve plug 24a of poppet 24 as shown. Since the pressures above poppet 24 acting on area $A_4$ and behind poppet 24 acting on area $A_5$ are substantially equal, then spring 52 biasing the poppet 24 upwardly is effective to close the poppet against a seat 53 which leads to flow passage 43.

First stage assembly 40 is maintained normally closed and may be a normally closed solenoid operated poppet valve assembly such as described in U.S. Pat. No. 3,737,141 by Kenneth W. Zeuner and assigned to the same assignee as the present invention. However, inlet 48 is coupled under the poppet as shown in the patent while conduit 42 is coupled above the poppet of the patent. Thus, the inlet and outlet of the valve assembly of the patent may be reversed.

In operation and with the valve assembly of FIGS. 1–4 in the normally closed state, valve 40 is energized. Thus, assembly 40 is actuated to its valve open state and fluid pressure in conduits 41 and 48 and area 44 is released through valve 40, conduit 42, flow passage 43 and dumped to tank. Since conduit 41 is connected through a restricted orifice 41a to chamber 46, fluid pressure in chamber 46 as well as chamber 45 slowly decreases. Accordingly, the difference of pressure applied to poppet 24 ($A_4$–$A_5$) is effective to move it downwardly thereby opening chamber 45 to dump pressure. Since chamber 46 is coupled to area 45 through conduit 50, chamber 46 begins to dump through flow passage 43.

While the pressure in chamber 46 decreases, the pressure in inlet 10 and channel 10a remain substantially the same for the reason that chamber 46 is coupled by way of a restricted orifice 29 back to channel 10a. In this manner, chamber 46 decreases in fluid pressure to dump while the pressure in conduit 10a and inlet 10 effectively remain at this time substantially the same. Accordingly, with the inlet or upstream pressure still being applied to chamber 15 as well as chamber 12, poppet 20 then begins to open. As poppet 20 opens, the inclining area seen by flow 21 increases. Thus, as poppet 20 opens still further until full open there is an increasingly greater force pushing poppet 20 open in view of the larger area "under" the poppet being exposed to upstream pressure. In this manner, inlet pressure is dumped to tank and the upstream pressure decreases until some equilibrium is approached.

It will be understood that the foregoing operation in which poppet 20 opens, upon energization of assembly 40, takes place extremely rapidly. In this manner, the substantially large opening provided by orifice 23a of seat 23 ($D_3$) is effective to quickly dump to tank the upstream pressure.

As poppet 20 opens and with area 46 being dumped to tank, some of the fluid under pressure from conduit 10a fbws through check valve poppet 26a into area 12. Accordingly, when poppet 20 has moved downwardly to its extreme open position, area 12 has become completely filled. Additionally, in this position of poppet 20, equilibrium is reached since the valve is maintained open by the pressure in inlet 10 which is effective against the force of spring 30.

As the fluid pressure in inlet 10 decreases, spring 30 would tend to close poppet 20. However, the fluid trapped in the chamber 12 cannot flow back through check valve poppet 26a and must flow through orifice 29 into area 46. As a result of this relatively slow flow through restricted orifice 29, there is provided a slow controlled or programmed period of closing poppet 20. The foregoing explains the "delay reset" of poppet 20 which is achieved by check valve poppet 26a and area 12.

In the manner previously described, as the upstream flow diminishes, poppet 20 would eventually close even though first stage valve assembly 40 is maintained energized and open. However, if there is a sufficient value of upstream pressure, the difference of pressure between that in inlet 10 and that in chamber 46 is sufficient to keep poppet 20 open against the force of spring 30. Thus, in this case in order to close poppet 20 or whenever it is desired to close the valve assembly quickly, first stage assembly 40 is deenergized. Accordingly, assembly 40 returns to its valve closed state and chamber 44 is closed with respect to tank. Then, flow from chamber 46 through orifice 41a is effective through poppet area $A_5$ to close second stage poppet 24. Further chamber 46 begins to fill through orifice 29. Thus, at this time, spring 30 becomes effective to slowly close poppet 20. It will now be understood that third stage poppet 20 operates under a balance condition when it is in its open state, that is the pressures on both sides of the poppet are equal.

It will now be understood how the valve assembly of FIGS. 1–4 provides a substantially high speed opening for a relatively high volume of fluid flow. In one aspect, high speed is achieved for the reason that third stage poppet 20 is hollow throughout its longitudinal dimension having a relatively minimum mass and it further follows that there is a substantially minimum amount of fluid required to be displaced in area 46 (in back of poppet 20).

In designing the valve assembly of FIGS. 1–4, a given parameter may be that first stage 40 has a known effective orifice diameter. Another given parameter may be a required effective orifice diameter of orifice 23a. Accordingly, the time required to fully open third stage poppet 20 is minimized by the following two design steps. As a first step, the geometry is determined for a maximum opening speed of a free piston poppet in which for example, the piston area of poppet 20 may be about 1½ times the area of orifice 23a. As a second step, the diameter of second stage orifice 53 is determined to result in a minimum time for fully opening third stage poppet 20.

With regard to outlet 16, the diameter in a typical example may be from 1–3 inches or even larger.

It will be seen that end cap 11a, as best shown in FIG. 2, is secured to the remaining portion of body 11 by means of bolts 56. It will also be seen that flow passage extension 14 has one end rigidly secured with respect to second stage orifice 53. The other end of extension 14 and the adjacent outer surface of the extension (of reduced outer diameter) is floating and nonfixed. The flow passage end 43a is located further downstream than third stage orifice 23a.

What is claimed is:

1. A three stage normally closed valve assembly for providing a substantially high speed third stage opening for a substantially high volume of upstream fluid flow from an inlet into an outlet comprising a first stage solenoid operated poppet valve assembly normally maintained closed for controlling flow of fluid through a second of said three stages, an orifice for a second of said stages, second stage poppet means movable between a second stage valve normally closed state seating in and closing said second stage orifice and a valve open state, flow passage extension means in fluid communication with said second stage orifice for providing fluid flow from said second stage orifice into said outlet of said valve assembly during said second stage valve open state, a third stage orifice opening directly into said outlet, third stage poppet means movable between a valve normally closed state seating in and closing said third stage orifice and a valve open state, said third stage poppet means having a longitudinal opening throughout its length for receiving therein said flow passage extension means said flow passage extension means having one end rigidly secured with respect to said second stage orifice and having the other end floating and nonfixed.

2. The valve assembly of claim 1 in which said other end of said flow passage extension means being completely open and located further downstream than said third stage orifice.

3. The valve assembly of claim 1 in which there is provided conduit means for flow of fluid from said inlet through a first restricted passage to a poppet chamber behind said third stage poppet remote from said third orifice, second conduit means including a second restricted passage for fluid flow from said poppet chamber to behind said second poppet.

4. The valve assembly of claim 3 in which there is provided third conduit means to provide flow of fluid between said poppet chamber and a chamber surrounding the valve plug of said second stage poppet.

5. The valve assembly of claim 4 in which said first stage is coupled to control fluid flow between said second conduit means and said flow passage extension means.

6. The valve assembly of claim 1 in which said flow passage extension means has one end rigidly secured with respect to said second stage orifice and having the other end and adjacent outer surface floating and unfixed and located further downstream than said third stage orifice.

7. The valve assembly of claim 6 in which said second stage poppet means, said second stage orifice and said flow passage extension means are coaxial.

8. The valve assembly of claim 6 in which said flow passage extension means is tubular shaped.

9. The valve assembly of claim 1 in which there is provided a housing for receiving said third stage poppet, said third stage poppet having a section of reduced outer dimension to form with said housing a varying volume reset chamber therebetween for receiving fluid under pressure.

10. The valve assembly of claim 9 in which there is provided check valve means for providing flow of fluid from said inlet into said reset chamber and preventing fluid flow from said reset chamber into said inlet, restricted flow passage means for flow of fluid from said reset chamber to a poppet chamber behind said third stage poppet whereby as said third stage poppet opens fluid is filled in said reset chamber and as third stage poppet closes fluid flow from said reset chamber through said restricted flow passage means to said poppet chamber provides for a slow programmed period of closing.

11. The valve assembly of claim 10 in which the transverse area of said poppet chamber is greater in value than the combined transverse areas of said reset chamber and said third stage poppet when closed upon which said upstream fluid pressure tends to push said third stage poppet open.

12. The valve assembly of claim 11 in which there is provided spring means within said poppet chamber tending to bias said third stage poppet closed.

13. The valve assembly of claim 1 in which said first stage valve assembly and said third stage orifice and poppet means have geometry determined for maximum opening speed with respect to said first and third stages and said second stage orifice and poppet means having geometry determined with respect to said first, second and third stages to provide said substantially high speed third stage opening.

* * * * *